US008832450B2

(12) United States Patent
Ciet et al.

(10) Patent No.: US 8,832,450 B2
(45) Date of Patent: Sep. 9, 2014

(54) METHODS AND APPARATUS FOR DATA HASHING BASED ON NON-LINEAR OPERATIONS

(75) Inventors: Mathieu Ciet, Paris (FR); Thomas Icart, Paris (FR); Augustin J. Farrugia, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/485,454

(22) Filed: May 31, 2012

(65) Prior Publication Data

US 2013/0326230 A1   Dec. 5, 2013

(51) Int. Cl.
*H04L 9/32*   (2006.01)

(52) U.S. Cl.
USPC .............................................. 713/181; 380/44

(58) Field of Classification Search
None
See application file for complete search history.

(56) References Cited

U.S. PATENT DOCUMENTS

| 7,725,724 | B2 * | 5/2010 | Ding et al. | 713/176 |
| 8,014,282 | B2 | 9/2011 | Li et al. | |
| 8,108,682 | B2 * | 1/2012 | Watanabe et al. | 713/181 |
| 8,280,056 | B2 * | 10/2012 | Gressel et al. | 380/268 |
| 8,447,032 | B1 * | 5/2013 | Covell et al. | 380/28 |
| 2009/0214024 | A1 * | 8/2009 | Schneider | 380/28 |
| 2010/0049986 | A1 * | 2/2010 | Watanabe et al. | 713/181 |
| 2011/0286596 | A1 * | 11/2011 | Gressel et al. | 380/268 |

OTHER PUBLICATIONS

Goi, Bok-Min et al., "Incremental Hash Function Based on Pair Chaining & Modular Arithmetic Combining," Lecture Notes in Computer Science, 2001, vol. 2247/2001, 50-61, 2001, pp. 50-61.
Lin, Ching et al., "Security and Trust Management in Mobile Agents: A New Perspective," 2005 $2^{nd}$ International Conference on Mobile Technology, Applications and Systems, Nov. 15, 2005, pp. 1-9.
Zhao, Geng et al., "Block Cipher Design: Generalized Single-Use-Algorithm Based on Chaos," Tsinghua Science & Technology, vol. 16, Issue 2, Apr. 2011, pp. 194-206.

* cited by examiner

*Primary Examiner* — Fikremariam A Yalew
(74) *Attorney, Agent, or Firm* — Blakely, Sokoloff, Taylor & Zafman LLP

(57) ABSTRACT

A method and an apparatus that provides a hard problem based hashing mechanism to improve security of hash functions are described. The hashing mechanism can include a custom padding and/or a post processing to a hashed value strengthened via operations specifying a hard problem. In one embodiment, a new hash function may be provided or defined directly without introducing or relying on existing hash functions to embed security features based on this hard problem. The new hash functions can be used in usual constructions implying hash functions. For example, the standard HMAC construction could be applied on these hash functions, standard signature algorithms or authentication protocol, etc.

11 Claims, 6 Drawing Sheets

400

Providing a non-linear permutation operation on a sequence of bits in a data unit, more than one representable values associated with the data unit, each representable value corresponding to a possible binary value of the sequence of bits 401

Performing a sequence of permutation operations on at least one of the representable values, the sequence of permutation operations including one or more of the non-linear permutation operation, the sequence of permutation operations depending on a message data represented via a plurality of the representable values of the data unit, and the sequence of permutation operations performed to generate at least one of permuted values, each permuted value is one of the representable values of the data unit 403

Performing combination operations on the permuted values for a hash data representing a cryptographic hash of the message data 405

Providing a non-linear permutation operation for a data unit having a sequence of bits representing a representable value of the data unit, the non-linear permutation operation to permute the sequence of bits 501

Performing a composition of permutation operations for a plurality of data units representing a plurality of different representable values of the data unit, the composition of permutation operations including one or more of the non-linear permutation operations interleaved with separate linear permutation operations, each linear permutation operation specified via a separate portion of a message data represented in one or more data unit, the separate portion of the message data corresponding to a value represented by one of the one or more data units, the composition of permutation operations to generate a plurality of representable values of the data unit 503

Performing combination operations on the permuted values for hash data representing a cryptographic hash of the message data 505

Fig. 5

METHODS AND APPARATUS FOR DATA HASHING BASED ON NON-LINEAR OPERATIONS

FIELD OF INVENTION

The present invention relates generally to cryptographic processing. More particularly, this invention relates to data hashing based on non-linear operations related to computationally hard problems to increase strength of cryptographic security.

BACKGROUND

In the field of cryptography, there is a need for signature, encryption, hashing mechanisms etc. Hash functions for implementing the hashing mechanisms may be related to key elements in cryptosystems to ensure security.

However, existing hash functions, for example, based on SHA (Secure Hash Algorithm)-1, SHA-2, SHA-3, . . . SHA-256 . . . or MD5 (Message-Digest Algorithm) may be inherently weak in their security strengths. For example, there are no proofs that attacking cryptographic systems based on these hashing functions are inherently hard (i.e. correspond to mathematically hard problems).

Thus, existing hashing functions do not provide modern cryptosystems a strong, secure and dependable hashing mechanism.

SUMMARY OF THE DESCRIPTION

A hard problem (e.g. from an algorithmic point of view) based hashing mechanism can improve security of existing hash functions. The hashing mechanism can include a custom padding and/or a post processing to a hashed value (e.g. based on a separate hashing function) strengthened via operations specifying a hard problem. In one embodiment, a new hash function may be provided or defined directly without introducing or relying on existing hash functions to embed security features based on this hard problem. The new hash functions (e.g. modified hash functions or new hash function) can be used in usual constructions implying hash functions. For example, the standard HMAC (Hash-based Message Authentication Code) construction could be applied on these hash functions, standard signature algorithms or authentication protocol, etc.

In one embodiment, a particular mapping operation may be provided for representable values of a data unit. The particular mapping operation can map one of the representable values to another one of the representable values. Input data may be represented in one or more data units separately having one or more input representable values of the data unit. Each input representable value can specify a mapping operation mapping one of the representable values to another one of the representable values. The input data can correspond to message data. In one embodiment, a sequence of mapping operations on one or more first representable values of the data unit may be performed to generate one or more second representable values of the data unit. The sequence of mapping operations can include at least one of the particular mapping operation. each mapping operation can map one of the representable values to another one of the representable values. The sequence of mapping operations can include one or more mapping operations specified by one or more of the input representable values. Combination operations may be performed on the one or more second representable values for a hash data representing a cryptographic hash of the message data.

In another embodiment, a non-linear permutation operation can be provided for a sequence of bits in a data unit. Multiple representable values may be associated with the data unit. Each representable value can correspond to a possible binary value represented by the sequence of bits. A sequence of permutation operations can be performed on at least one of the representable values to generate one or more permuted values. The sequence of permutation operations may include one or more of the non-linear permutation operations. The sequence of permutation operations may depend on message data represented via a plurality of the representable values of the data unit. Each permuted value may be one of the representable values of the data unit. Combination operations can be performed on the permuted values for a hash data representing a cryptographic hash of the message data In another embodiment, a non-linear permutation operation can be provided for a data unit having a sequence of bits representing a representable value of the data unit. The non-linear permutation operation may be performed to effectively permute the sequence of bits. A composition of permutation operations may be performed for a plurality of data units representing a plurality of different representable values of the data unit. The composition of permutation operations can include one or more of the non-linear permutation operations interleaved with separate linear permutation operations. Each linear permutation operation can be specified via a separate portion of a message data represented in one or more data units. Each separate portion of the message data can correspond to a value represented by one of data units. The composition of permutation operations may be performed to generate a plurality of representable values of the data unit. Combination operations can be performed on the plurality of representable value for a data representing a cryptographic hash of the message data.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 4 is a flow diagram illustrating one embodiment of a process for data hashing based on non-linear permutation operations;

FIG. 5 is a flow diagram illustrating one embodiment of a process for data hashing based on composition of non-linear permutation operations and linear permutation operations;

DETAILED DESCRIPTION

Figure 1:
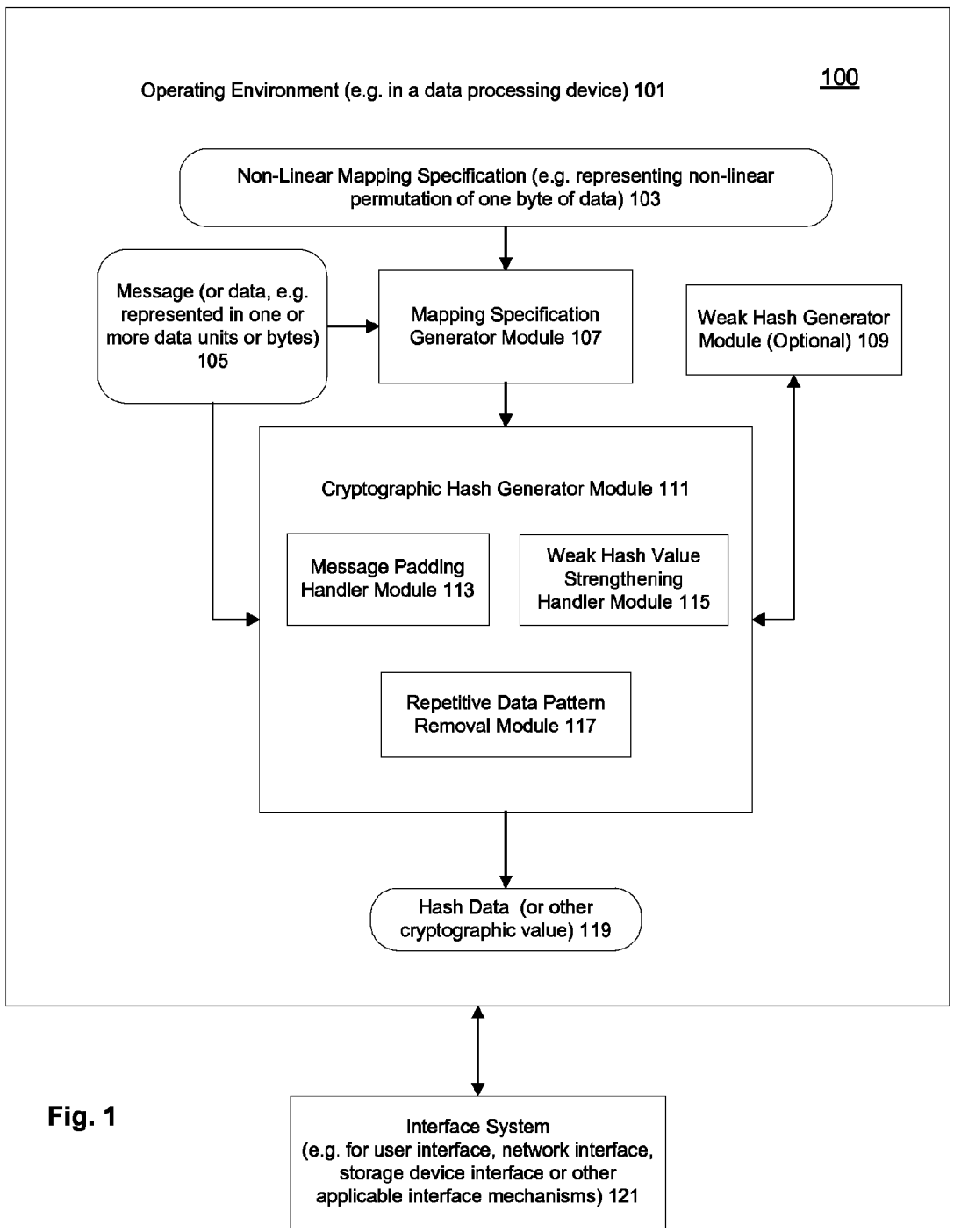
FIG. 1 is a block diagram illustrating one embodiment of a system for data hashing based on non-linear operations.

Methods and apparatuses for data hashing based on non-linear bijection operations are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

Cryptography schemes, such as data hashing or hashing operations, based on mathematically hard problems can have certain improved security features because they are based on mathematically hard problems and therefore they are more resistant to reverse engineering. Examples of such hard problems may include the factorization problem, the discrete logarithm problem, or other non-linear operation related problems.

A hard problem can be a computational problem that is in principle not amenable to being solved by a processing device or computer. For example, the hard problem can correspond to a set of instructions operable by the processing device to generate a solution requiring too significant amount of resources to be practically solved in a feasible way. A problem may be regarded as inherently difficult if its solution requires such significant resources (e.g. over a long period of time) regardless which algorithm is used for the solution.

A hashing mechanism (or a hash function) based on such methodology can be very efficient to provide a hash data for a message, reduce potential collisions, and make it very difficult to identify the message or another message corresponding to the hashing data. In other words, for each different message, identifying corresponding input messages as function of the output hash data can be a hard problem. Thus, operations to reverse the hashing mechanism can be ensured to be practically impossible. In certain embodiments, the number of operations required may exponentially relate to a size (e.g. bit length) n of input messages, such as in the order of $2^n$.

Introduction to a New Mathematical Hard Problem

In one embodiment, let P be a non linear permutation on Bytes. A byte or Byte can be a data unit having, for example, a sequence of 8 bits or other suitable number of bits to represent a value in a binary format via binary states associated with the bits. An array T with a size of the total number of representable values of a data unit may represent permutation P over the data unit such that T[x]=P(x) for each representable value x of the data unit. Considering an 8-bit byte data unit as an example, P can be represented as a 256 Bytes array (e.g. an input array) T[x]=P(x) where x is a Byte from 0 to 255.

A permutation can be either linear or non-linear. A linear permutation LP can be defined as a permutation with a property: $LP(x \oplus y) = LP(x) \oplus LP(y)$, for two bytes x and y. A non-linear permutation P does not have this property. The non linearity characteristic of P can enable the security features required for the hashing mechanism described herein.

Let M be another array/matrix/table of size s Bytes (this means inputs are of size $\log_2(s)$ and outputs are bytes or other applicable data units) and T be an array representing P over a data unit, a new permutation denoted P_M can be defined or specified as a bijection between a set of all possible representable values of a data unit (e.g. $\{0, \ldots, 255\}$) and the set of values itself:

$$P\_M(x) = P(\ldots P(P(x \oplus M[0]) \oplus M[1]) \ldots \oplus M[s-2]) \oplus M[s-1] \quad (1)$$

The permutation can be re-written as follows:

$$P\_M = (P \oplus M[s-1]) \circ (P \oplus M[s-2]) \circ \ldots \circ (P \oplus M[1])) \circ (Id \oplus M[0]) \quad (2)$$

where "$\circ$" is the composition (e.g. $F \circ G(x) = F(G(x))$) and Id the identity (e.g. representing an identity bijection mapping). The function $(P \oplus M[i])$ is classically defined by: $x \to P(x) \oplus M[i]$. Note that P_M may also be re-written as:

$$P\_M = (Id \oplus M[s-1]) \circ P \ldots \circ (Id \oplus M[1]) \circ P \circ (Id \oplus M[0])$$

Thus, array P_M may correspond to a sequence of permutation operations with the non-linear permutation P interleaved among the sequence. The sequence of permutations may also include linear permutations such as $(Id \oplus M[0])$, $(Id \oplus m[1]) \ldots$ etc.

A bijection may be a function giving an exact pairing of the elements of two sets. Every element of one set is paired with exactly one element of the other set, and every element of the other set is paired with exactly one element of the first set. There may be no unpaired elements.

The function P_M defined in (1) and (2) can be represented as an array or a table. In the following, P_M is denoted as a table U_M which is taking a value representable in a Byte as input and outputting another value also representable in a Byte.

Given T which is independent of any message data, and U_M which depends on array M, a mathematically hard problem can be defined for security features of a new hash function of a message data related to M as: identifying an array M1 such that:

$$U\_M1[x] U\_M[x]$$

for at least n possible values of x (e.g. indexes or representable values of a data unit) is hard, for a sufficiently large n. In other words, performing reverse operations on U_M and T to search for M or corresponding M (such as M1) is a mathematically hard problem useful to resist cryptographic attacks.

Although certain sizes are presented as examples for illustration purposes, these sizes can be generalized easily to others. For instance, T can be a longer or a smaller array and we can work on less bits or more bits: from 4 to 16 bits or other applicable number of bits.

Using Existing Hash Functions

Existing hash functions, such as SHA1, SHA2, MD5 based hash functions, can be strengthened with non-linear permutation operations. In one embodiment, a message data can be preprocessed based on the non-linear permutation operations prior to the application of these hash functions. The non-linear permutation operations (e.g. implemented in a small code) may fix broken hash functions (e.g. MD5, SHA1 based hash functions) to allow reuse of existing implementations for these broken hash functions.

For example, let M be a message or message data. Let U_M be the array from P_M defined in (2). Let H be a given hash function (for instance SHA1, SHA2 etc.), an updated hash function:

$$H(M\|U\_M[0]\|U\_M[1]\|\ldots\|U\_M[s-1]),$$

where "||" denotes the concatenation, s is less than the maximum number of representable values of a data unit associated with U_M, can be an "acceptable" modification of H. "Acceptable" can mean improving the security of the underlying hash function.

U_M can be used in padding for an existing (e.g. weak or broken) hash function H (e.g. MD5 function). Here, elements of U_M can be selected for padding message M. Additional bytes may be appended to the end of message M to increase security. For certain hash functions, padding may be required to align an input message to these hash functions, for example, along block sizes, such as multiple of 16 bytes.

Alternatively, non-linear operations based on array (or table) U_M can be applied on the output of an existing hash function H to increase security strength. For example, an updated hash function:

$$H(M) \oplus (U\_M[0]\|U\_M[1]\|\ldots\|U\_M[n-1])$$

is an "acceptable" modification of H, where H(M) is an n Byte (or n number of data units) long data (e.g. n≤256 for 8-bit byte data unit).

Although n first values of U_M (i.e. from U_M[0] to U_M[n−1]) are used as an example, any n values in the 256 values of U_M could be used.

Moreover, any n bytes function of U_M could be used. This results, for instance to $$H(M) \oplus (H(U\_M[0]\|\ldots\|U\_M[255]))$$

corresponding to hashing a message data, hashing a value concatenated from elements of U_M specified by the message data, and performing exclusive-or operations on these two hashed results together. These variants or other applicable variants based on U_M array may strengthen existing hash functions.

A Stand Alone Hash Function

In some embodiments, a hash (or hashing) data of a message M can be provided directly via U_M specified according to arrays (or vectors) T and M. If the size (or number of elements) of array T is small (e.g. relative to the size of the message), T may have small cycles. In other words, for some x, there exists n such that $T(T(T \ldots (T(x)) \ldots )))=x$, where there are n usages of T. If array M (which is based on input message) contains repetitive patterns (e.g. consecutive 0 or other recognizable patterns), the strength of a hash data based on U_M may be weakened.

To avoid repetitive patterns, array M may be generated from updated message data instead of directly from original message data. For example, a classical technique, known as message byte counter, can be applied on the original message data to remove potential repetitive patterns. Specifically, let ct be this counter. For each block of 16B (byte), counter value increments by 1 or other applicable amount for each increment. To accept sufficiently long message, the counter can be represented as 4 bytes (8 bytes, or any size is also possible as variant). As an example, the addition of counter ct can transform or update M into M':

$$M[0]\|\ldots\|M[15]\|ct[0]\|\ldots\|ct[3]\|M[16]\|\ldots\|M[31]\\ \|ct[0]+1\|\ldots\|ct[3]\|$$

$$M[32]\|\ldots\|M[4096]\|\ldots\|M[4111]\|ct[0]\|ct[1]+1\|ct\\ [2]\|ct[3]\|M[4112]\ldots$$

M' can be used to construct U_M'. After these steps, U_M' can be a random buffer or an array of values having an added randomness among these values.

As a result, one example of hash data of message M can be obtained via operations related to (U_M' [0], U_M' [1]⊕1, U_M'[s−1]⊕(s−1)), where s can be a sufficiently large number (e.g. less than the size of array U_M').

Many other functions of U_M' may be applicable, such as:

$$(U\_M'[0]+U\_M'[1]+\ldots+U\_M'[15]\|U\_\\ M'[16]+\ldots+U\_M'[31]\|\ldots\|U\_\\ M'[240]+\ldots+U\_M'[255])$$

for a 16 byte hash function. Alternatively, a hash function H(U_M') can be obtained by applying a hash function H (e.g. a weak hash function) on array U_M'.

FIG. 1 is a block diagram illustrating one embodiment of a system for data hashing based on non-linear operations. In one embodiment, system 100 may include operating environment 101 hosted in a data processing device, such as a mobile phone device, a desktop computer, a server or other applicable devices etc. Operating environment 101 may include message 105 received or retrieved via interface system 121 providing, for example, user interface, network interface, storage device interface or other applicable interface mechanisms. Message 105 may be user data, media data, streaming content or other applicable data to be protected from unauthorized access In one embodiment, message 105 may be represented in one or more data units. A data unit may include a sequence of bits. Each bit may be configured to represent a binary value, such as 0 or 1 as binary states for the bit. The sequence of bits may be ordered to represent a finite set of values via different configurations of binary states of the bits. An exemplary data unit may be a byte including 8 bits or other suitable number of bits.

Non-linear mapping specification 103 may be preconfigured for cryptographically process message 105, such as generating a corresponding hashing (or hash) data. In one embodiment, non-linear mapping specification 103 may include a table or an array of values, such as array T as previously discussed, representing a non-linear permutation on sequence of bits in a data unit. As an example, non-linear mapping specification 103 may include a set of 256 values for an data unit as a byte of 8 bits.

Mapping specification generator module 107 can provide a separate non-linear mapping specification, such as a non-linear permutation for a data unit, based on preconfigured specification 103 and message 105. Generator 107 may provide an array of values representing a non-linear mapping, such as array U_M as previously discussed. Module 107 may selectively forward cryptographic hash generator module 111 one or more of the array of values representing the non-linear mapping specification generated. In one embodiment, given a particular non-linear mapping specification, identifying or searching one or more possible message data, such as message 105, for module 107 to generate the particular non-linear mapping specification using non-linear mapping speciation 103 may be a mathematically hard problem and cannot be practically completed or performed.

In some embodiments, cryptographic hash generator module 111 can generate hash data 119 for message 105 based on a non-linear mapping specification 107. Alternatively or optionally, cryptographic hash generator module 111 may strengthen security features (e.g. to protect against cryptographic attacks) for existing hash functions, such as MD5, SHA1 or other commonly used hash functions, in weak hash generator module 109.

For example, message padding handler module 113 may perform padding operations on message 105 based on a non-linear mapping sequence provided via mapping specification generator module 107. Padding operations may arrange representation of message 105 into particular patterns, for example, filling out boundaries of certain sizes of data units, such as a block of bytes. Cryptographic hash generator module 111 may reuse weak hash generator module 109 to generate hash data 119 based on the padded message.

In some embodiments, hash strengthening handler module 115 can update a weak hash value with a non-linear mapping specification from mapping specification update module 107 to increase difficulty (or computational resource needed) in attacking the updated hash value. The weak hash value may be generated from message 105 via weak hash generator module 109. Cryptographic hash generator module 111 may further secure the weak hash value to provide hash data 119. For example, module 111 may cause hash strengthening handler module 115 to perform combination or arithmetic operations on the weak hash value with a non-linear mapping specification provided via mapping specification generator module 107.

Representations of message 105 (e.g. based on one or more data units) may be altered or adjusted to reduce possibilities of cryptographic attacks, such as reverse hashing. In one embodiment, repetitive data pattern removal module 117 can insert representations of counters with counting values into a representation of message 105 to provide an updated message to remove possible repetitive patterns in the representation of message 105. The updated message may be represented using more data units than the original message 105. In one embodiment, cryptographic hash generator module 111 can generate hash data 119 for message 105 based on the updated message using a non-linear mapping specification (e.g. permutation) provided via mapping specification update module 107 without using weak hash generator module 109.

Figure 2:
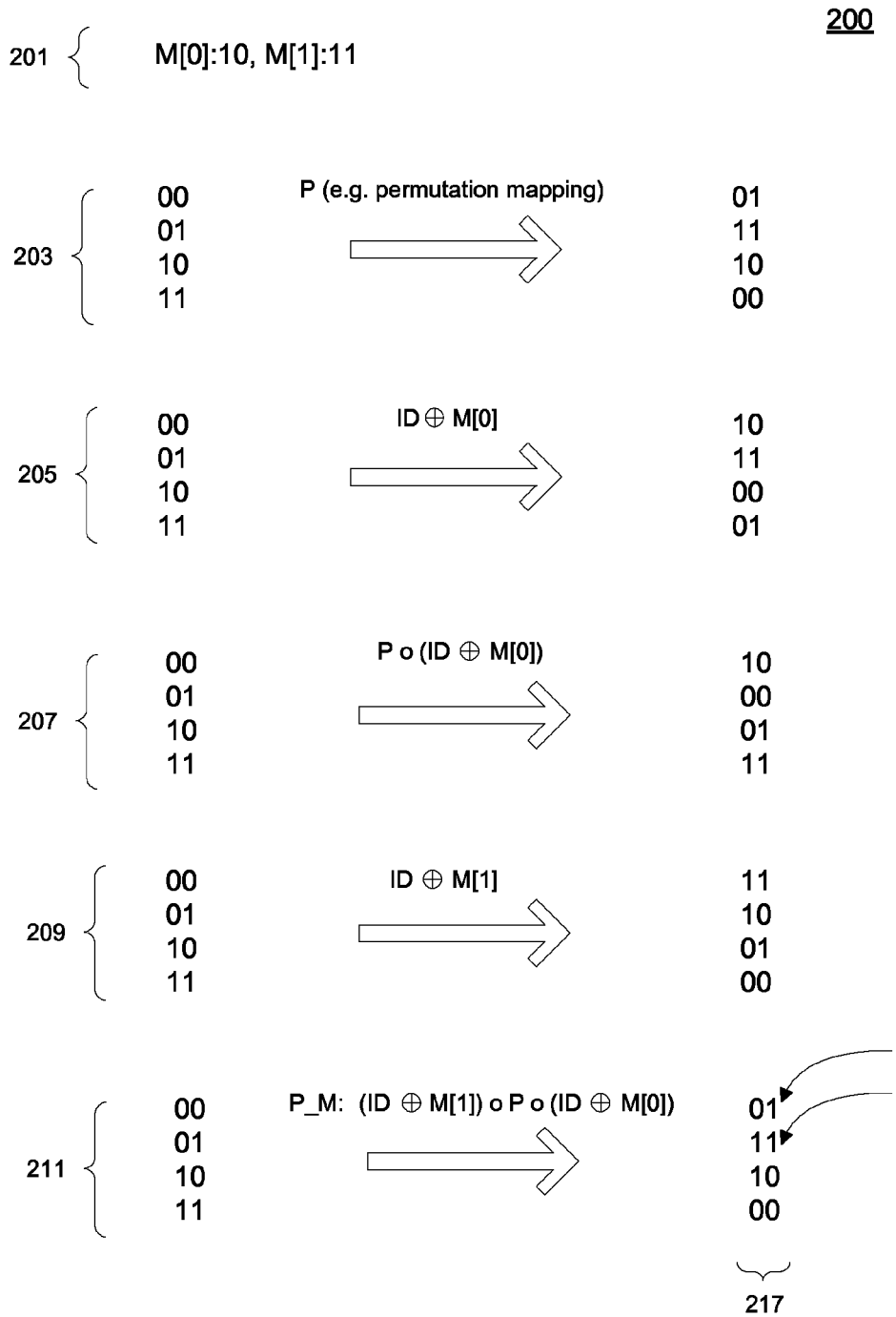
FIG. 2 illustrates exemplary non-linear operations for data hashing.

FIG. 2 illustrates exemplary non-linear operations for data hashing. Example 200 may be based on some components of system 100 of FIG. 1. In one embodiment, message 201 may represent two data units M[0], M[1] of a message or message data. Each data unit may have a sequence of two bits capable of representing four different values.

Non-linear permutation P 203 may correspond to a non-linear mapping specification for a set of values representable via a two-bit based data unit. A non-linear mapping may correspond to a bijection function over the same set of values. Non-linear permutation P_M 211 may be generated from message 201 and permutation 203, such as based on mapping specification generator module 107 of FIG. 1, to provide a hash data for message 201.

Mapping P_M 211 may be obtained as a composition of multiple mappings, 203, 205, 209. For example, mapping 205 may represent a permutation based on an exclusive-or operation using a portion of message data 201 M[0] with a set of values (e.g. corresponding to ID) representable via a two bit data unit. Similarly, mapping 209 can represent a permutation based on an exclusive-or operation using a portion of message data 201 M[1]. Mapping 207 may represent a composition of mappings 205, 203, e.g. a linear permutation followed by a non-liner permutation, or an updated non-linear permutation with a linear permutation followed by a non-linear permutation.

Mapping P_M 211 can represent a composition of a non-linear permutation P 203 and two linear permutations 205, 209 separately specified via portions of message 201. Specification of mapping P_M may include an ordered set of values 217. One or more values, 213, 215 may be selected from ordered set of values 217 from corresponding mapping P_M, and may be used for composing hash data of message 201.

Figure 3:
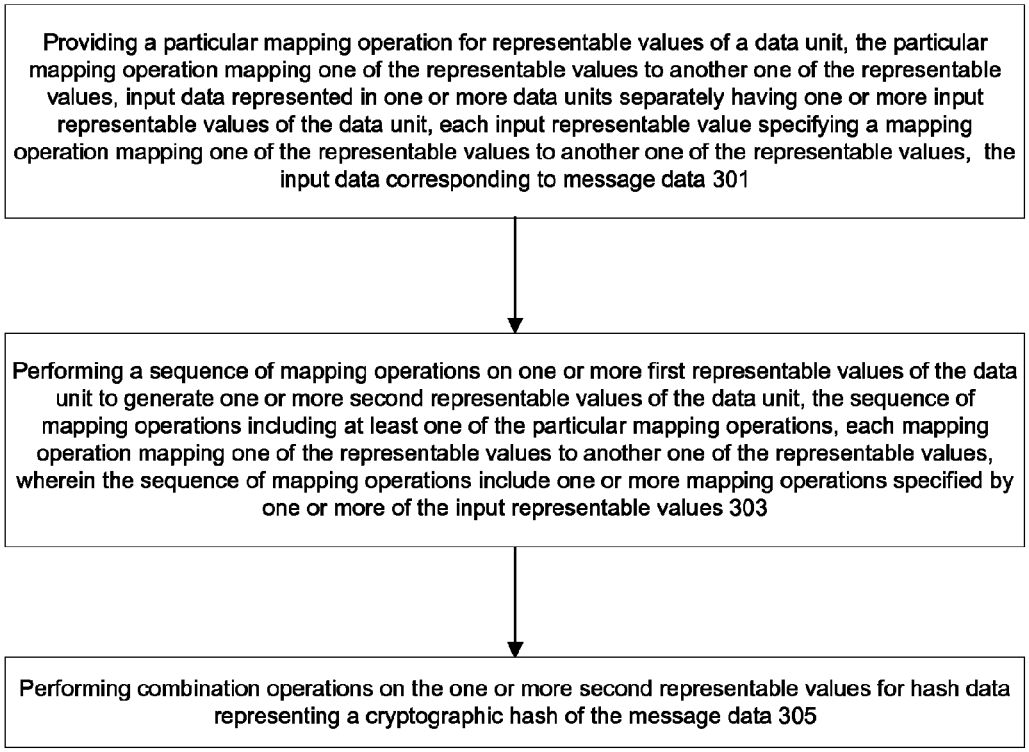
FIG. 3 is a flow diagram illustrating one embodiment of a process for data hashing based on non-linear operations.

FIG. 3 is a flow diagram illustrating one embodiment of a process for data hashing based on non-linear operations. Exemplary process 300 may be performed by a processing logic that may comprise hardware (circuitry, dedicated logic, etc.), software (such as is run on a dedicated machine), or a combination of both. For example, process 300 may be performed by some components of system 100 of FIG. 1. At block 301, the processing logic of process 300 can provide a particular mapping operation for representable values of a data unit (e.g. a byte). The particular mapping operation may correspond to a bijection function on the representable values of the data unit, such as 256 binary values representable in an 8-bit byte. The particular mapping operation can be a non-linear permutation operation on a set of binary bits representing the representable values.

A data unit can include a sequence of bits to represent, for example, a binary value or binary number. Each bit can have a binary state. Each representable value of the data unit may correspond to a binary number represented by a configuration of binary states in the sequence of bits. Each mapping operation on the data unit can correspond to a permutation of the sequence of bits in the data unit.

In one embodiment, input data, corresponding to message data, such as message 105 of FIG. 1, may be represented in one or more input representable values of one or more data units. Each input representable value can specify a bijection mapping or function on the representable values of the data unit. For example, an exclusive-or operation between a first representable value and a second representable value of the data unit may effectively linearly permute (e.g. via exclusive-or based mapping operations) a sequence of bits representing the first representable value in the data unit.

At block 303, the processing logic of process 300 can perform a sequence or a series of mapping operations on a first array (or ordered collection) of representable values of a data unit to generate a second array of representable values of the data unit. Each mapping operation can represent a bijection function on the representable values of the data unit. The sequence of mapping operations may include linear and non-linear mapping operations.

For example, the sequence of mapping operations can include one or more non-linear permutation operations interleaved with, for example, other mapping operations in the sequence. A non-linear permutation operation may be performed based on a table look up, for example, using an array of values stored in a storage device or memory to specify the non-linear permutation. The sequence of mapping operations may include one or more linear permutations or other applicable permutation operations separately specified by input representable values of data units representing message data to be hashed or cryptographically processed.

In one embodiment, the number of the second array of representable values of a data unit generated may be configurable. For example, this number may be no less than a minimum number (e.g. 16 for an data unit with 8 bits) to ensure sufficient cryptographic security. The size (or number) of the second array of representable values may be no more than the total possible representable values of the data unit (e.g. 256 for a 8-bit data unit).

The sequence of mapping operations based on message data and a non-linear permutation function specified by the particular mapping operation may correspond to a separate non-linear permutation function. Given the non-linear permutation function and a separate non-linear permutation function, identifying a corresponding message data using the corresponding sequence of mapping operations may require a plurality of arithmetic operations regardless which algorithms or mechanisms are adopted. The number of the arithmetic operations required can be exponentially related to the number of mappings specified by the separate non-linear permutation function (e.g. 256 in for an 8-bit sequence associated with the permutation).

At block 305, the processing logic of process 300 can perform combination operations on the second collection of representable values of the data unit for hash data representing a cryptographic hash of message data. The combination operations may include concatenation, exclusive-or or other applicable bit manipulation or arithmetic operations.

For example, the combination operations can include concatenation operations to generate a padded message data corresponding to input message data according to, for example, certain block sizes. A block size (e.g. 512, 1024, 1K, or other applicable sizes) may indicate a minimum number of data units (e.g. bytes) required to represent a message. The processing logic of process 300 may generate padding data for padding message data.

In one embodiment, the padding data may be represented in a plurality of ordered data units, each data unit representing one of the second array of representable values (e.g. following the order in the second array) which represents a derived non-linear permutation function based on the message data (or original message data) and a non-linear permutation function. The processing logic of process 300 may perform the concatenation operations to pad the message data with the padding data according to the order in the ordered data units.

Alternatively or optionally, the processing logic of process 300 may apply an existing hash function (e.g. SHA1, MD5, or other weak hash functions) on padded message data for hash data of the message data. A result of the hash function applied directly on the message data may be cryptographically weaker than the hash data, for example, to protect against security attacks on the corresponding hashing mechanism for the message data. The hash function may require data representation bounded by blocks of a fixed number of data units. The padded message data may be represented via a first number of data units for the message data appended with a second number of data units representing the padding data to confirm with the boundary requirements in the representation.

Alternatively, the processing logic of process 300 may apply the hash function on the message data (e.g. padded with 0 in a well known manner) for an intermediate hash data which may be cryptographically weak. Subsequently, the processing logic of process 300 can perform one or more arithmetic operations (e.g. exclusive-or operations) on the intermediate hash data and the padding data for the hash data.

In some embodiments, the processing logic of process 300 may provide the hash data for the message data without relying on other hash functions. The combination operations may be performed to rearrange representation of the message data for the input data used to provide a non-linear permutation function from a configured or specified non-linear permutation function.

For example, the processing logic of process 300 may insert additional data units representing additional values to a plurality of data units representing the message data for the input data or rearranged message data. These additional values may be provided to reduce potential or possible repetitive patterns manifested in the data units representing the original message data. In some embodiments, these additional values may indicate counting along a sequence of data units representing the message data.

The processing logic of process 300 may generate hash data for the message data via exclusive-or operations on the array of representable values of a data unit representing the non-linear permutation function for a sequence of bits of the data unit generated based on the input data (e.g. with the additional values) and the configured non-linear permutation function for the sequence of bits of the data unit.

FIG. 4 is a flow diagram illustrating one embodiment of a process for data hashing based on non-linear permutation operations. Exemplary process 400 may be performed by a processing logic that may comprise hardware, software, or a combination of both. For example, process 400 may be performed by some components of system 100 of FIG. 1. At block 401, the processing logic of process 400 can provide a non-linear permutation operation on a sequence of bits in a data unit. More than one representable values can be associated with all possible configurations of the sequence of bits for the data unit. For example, each representable value of the data unit can correspond to a possible binary value represented by the sequence of bits.

At block 403, the processing logic of process 400 may perform a sequence of permutation operations on at least one of the representable values of the data unit to generate at least one of the permuted values. Each permuted value may be one of the representable values of the data unit. The sequence of permutation operations can include one or more of the non-linear permutation operation. The sequence of permutation operations may depend on a message data represented via a plurality of the representable values of the data unit. At block 405, the processing logic of process 400 can perform combination operations on the permuted values for hash data representing a cryptographic hash of the message data.

FIG. 5 is a flow diagram illustrating one embodiment of a process for data hashing based on composition of non-linear permutation operations and linear permutation operations. Exemplary process 500 may be performed by a processing logic that may comprise hardware, software, or a combination of both. For example, process 500 may be performed by some components of system 100 of FIG. 1. At block 501, the processing logic of process 500 can provide a non-linear permutation operation for a data unit having a sequence of bits representing a representable value of the data unit. The non-linear permutation operation can generate a permuted value corresponding to permuting the sequence of bits representing the representable value. The non-linear permutation operation may be specified via an array of representable values of the data unit.

At block 503, the processing logic of process 500 can perform a composition of permutation operations for a plurality of data units representing a plurality of different representable values of the data unit. The composition of permutation operations can include one or more of a pre-specified non-linear permutation operations interleaved with separate linear permutation operations. Each linear permutation operation may be determined dynamically via message data.

In one embodiment, the message data may be represented in one or more data units. Each separate portion of the message data can correspond to a separate value corresponding to a separate one of the data units representing the message data. Each linear permutation operation can be specified according to the separate value for the message data.

The processing logic of process 500 can perform the composition of permutation operations to generate one or more of representable values of the data unit. The composition of permutation operations can correspond to a separate non-linear permutation on the sequence of bits of the data unit. At block 505, the processing logic of process 500 can perform combination operations on the permuted values for hash data representing a cryptographic hash of the message data.

Figure 6:
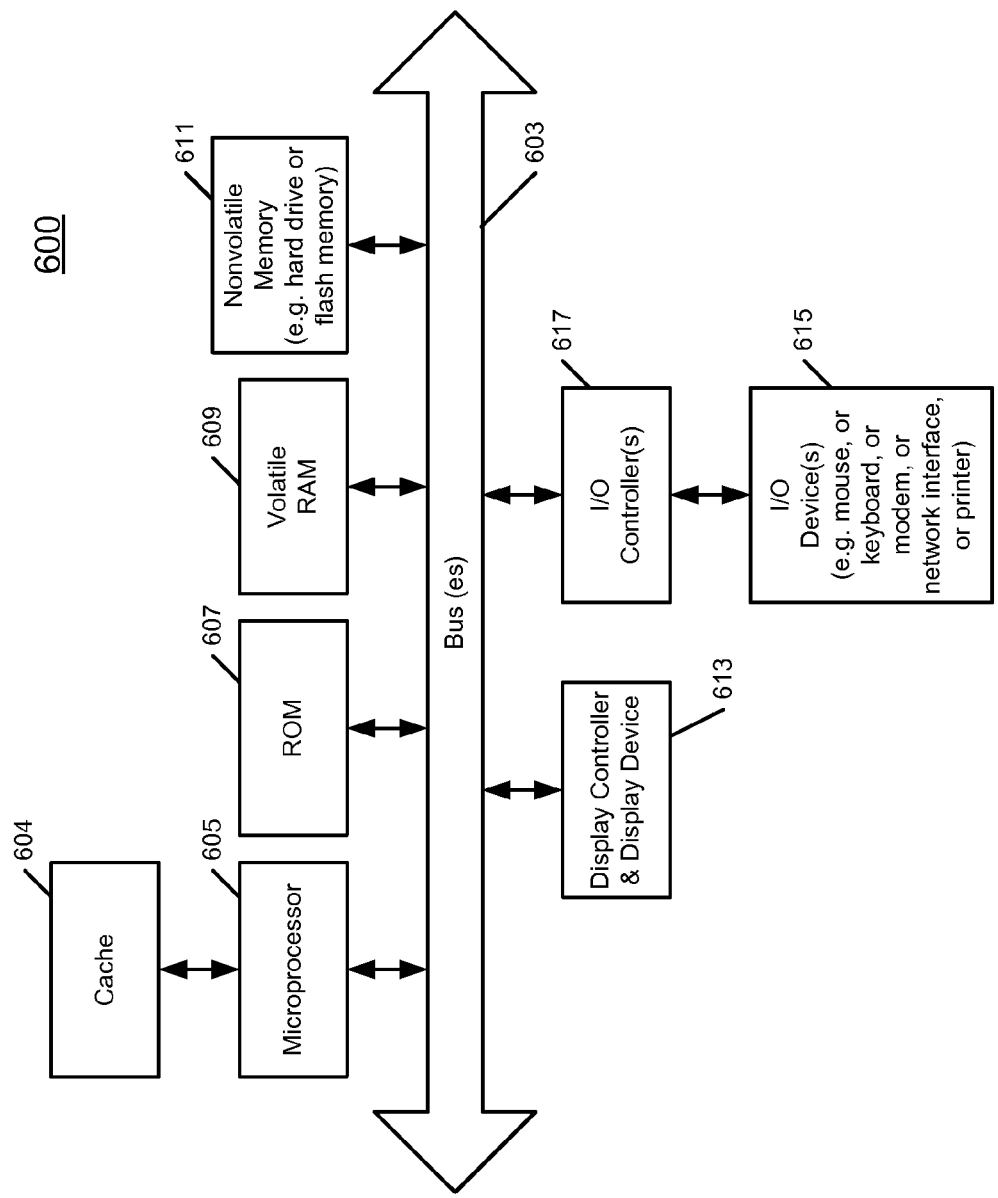
FIG. 6 illustrates one example of a data processing system such as a computer system, which may be used in conjunction with the embodiments described herein.

FIG. 6 shows one example of a data processing system, such as a computer system, which may be used with one embodiment the present invention. For example, system 1 of FIG. 1 may be implemented as a part of the system shown in FIG. 6. Note that while FIG. 6 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 6, the computer system 600, which is a form of a data processing system, includes a bus 603 which is coupled to a microprocessor(s) 605 and a ROM (Read Only Memory) 607 and volatile RAM 609 and a non-volatile memory 611. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 613 and to peripheral devices such as input/output (I/O) devices which may be mice, keyboards, modems, network interfaces, printers and other devices which are well known in the art. Typically, the input/output devices 615 are coupled to the system through input/output controllers 617. The volatile RAM (Random Access Memory) 609 is typically implemented as dynamic RAM (DRAM) which requires power continually in order to refresh or maintain the data in the memory.

The mass storage 611 is typically a magnetic hard drive or a magnetic optical drive or an optical drive or a DVD RAM or a flash memory or other types of memory systems which maintain data (e.g. large amounts of data) even after power is removed from the system. Typically, the mass storage 611 will also be a random access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or a wireless networking interface. The bus 603 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable non-transitory storage medium having instructions therein, which when executed by a machine, cause the machine to perform a method, the method comprising:
providing a non-linear permutation operation on a sequence of bits in a data unit, wherein more than one representable values are associated with the data unit, each representable value corresponding to a possible binary value of the sequence of bits, a message data represented via a plurality of representable values of the data unit;
performing a sequence of permutation operations to generate a representation of a bijection mapping relationship on the representable values of the data unit, wherein the sequence of permutation operations include one or more of the non-linear permutation operation, wherein the sequence of permutation operations depends on the message data, the bijection mapping relationship corresponding to a particular permutation operation on the sequence of bits;
generating a plurality of permuted values respectively from a plurality of index values via the particular permutation operation, each permuted value corresponding to one of the index values permuted via the particular permutation operation, each index value belonging to the representable values of the data unit, the index values independent of the message data; and
performing combination operations on the permuted values for a hash data representing a cryptographic hash of the message data.

2. The medium of claim 1, wherein the sequence of permutation operations include at least one linear permutation operation, and wherein the linear permutation operation is based on an exclusive or operation with one of the plurality of representable values for the message data.

3. The medium of claim 2, wherein the sequence of permutation operations includes the non-linear permutation operation interleaved among the sequence.

4. The medium of claim 3, wherein the combination operations include one or more concatenation operations for padding the message data.

5. The medium of claim 1, wherein the combination operations include one or more exclusive-or operations.

6. A machine-readable non-transitory storage medium having instructions therein, which when executed by a machine, cause the machine to perform a method, the method comprising:
providing a non-linear permutation operation for a data unit having a sequence of bits representing a representable value of the data unit, the non-linear permutation operation to permute the sequence of bits;
performing a composition of permutation operations for a plurality of data units representing a plurality of different representable values of the data unit, the composition of permutation operations including one or more of the non-linear permutation operations interleaved with separate linear permutation operations, each linear permutation operation specified via a separate portion of a message data represented in one or more data units, the separate portion of the message data corresponding to a value represented by one of the one or more data units, wherein the composition permutation operations are performed to generate a representation of a bijection mapping relationship on the plurality of representable values of the data unit, the bijection mapping relationship corresponding to a particular permutation operation on the sequence of bits;
generating a plurality of permuted values respectively from a plurality of index values via the particular permutation operation, each permuted value corresponding to one of the index values permuted via the particular permutation operation, each index value belonging to the representable values of the data unit, the index values independent of the message data and
performing combination operations on the plurality of permuted values for a hash data representing a cryptographic hash of the message data.

7. The medium of claim 6, wherein the permuted values correspond to an order set of values according to the index values, and wherein one or more of the permuted data are selected for the combination operations for the hash data.

8. The medium of claim 6, wherein the non-linear permutation operation is provided via a table lookup.

9. The medium of claim 6, wherein the message data corresponds to an intermediate hash data of an original message data hashed via a hash function and wherein the hash data is cryptographically strengthened via the combination operations over the intermediate hash data to represent the original message data.

10. A machine implemented method performed by a hardware processor, the hardware processor configured to:
provide a non-linear permutation operation on a sequence of bits in a data unit, wherein more than one representable values are associated with the data unit, each representable value corresponding to a possible binary value of the sequence of bits, a message data represented via a plurality of representable values of the data unit;
perform a sequence of permutation operations to generate a representation of a bijection mapping relationship on the representable values of the data unit, wherein the sequence of permutation operations include one or more of the non-linear permutation operation, wherein the sequence of permutation operations depends on the message data, the bijection mapping relationship corresponding to a particular permutation operation on the sequence of bits;
generate a plurality of permuted values respectively from a plurality of index values via the particular permutation operation, each permuted value corresponding to one of the index values permuted via the particular permutation operation, each index value belonging to the representable values of the data unit, the index values independent of the message data; and
perform combination operations on the permuted values for a hash data representing a cryptographic hash of the message data.

11. A computer system comprising:
a memory storing executable instructions;
an interface to receive a message data;
a processor coupled to the memory and the interface to execute the instructions from the memory, the processor being configured to provide a non-linear permutation operation for a data unit having a sequence of bits representing a representable value of the data unit, the non-linear permutation operation to permute the sequence of bits, perform a composition of permutation operations for a plurality of data units representing a plurality of different representable values of the data unit, the composition of permutation operations including one or more of the non-linear permutation operations interleaved with separate linear permutation operations, each linear permutation operation specified via a separate portion of a message data represented in one or more data units, the separate portion of the message data corresponding to a value represented by one of the one or more data units, wherein the composition permutation operations are performed to generate a representation of a bijection mapping relationship on the plurality of representable values of the data unit, the bijection mapping relationship corresponding to a particular permutation operation on the sequence of bits, generate a plurality of permuted values respectively from a plurality of index values via the particular permutation operation, each permuted value corresponding to one of the index values permuted via the particular permutation operation, each index value belonging to the representable values of the data unit, the index values independent of the message data, and perform combination operations on the plurality of permuted values for a hash data representing a cryptographic hash of the message data.

\* \* \* \* \*